L. L. GILBERT.
AUTOMOBILE TOOL.
APPLICATION FILED JULY 14, 1920.
1,419,922.
Patented June 20, 1922.
2 SHEETS—SHEET 1.
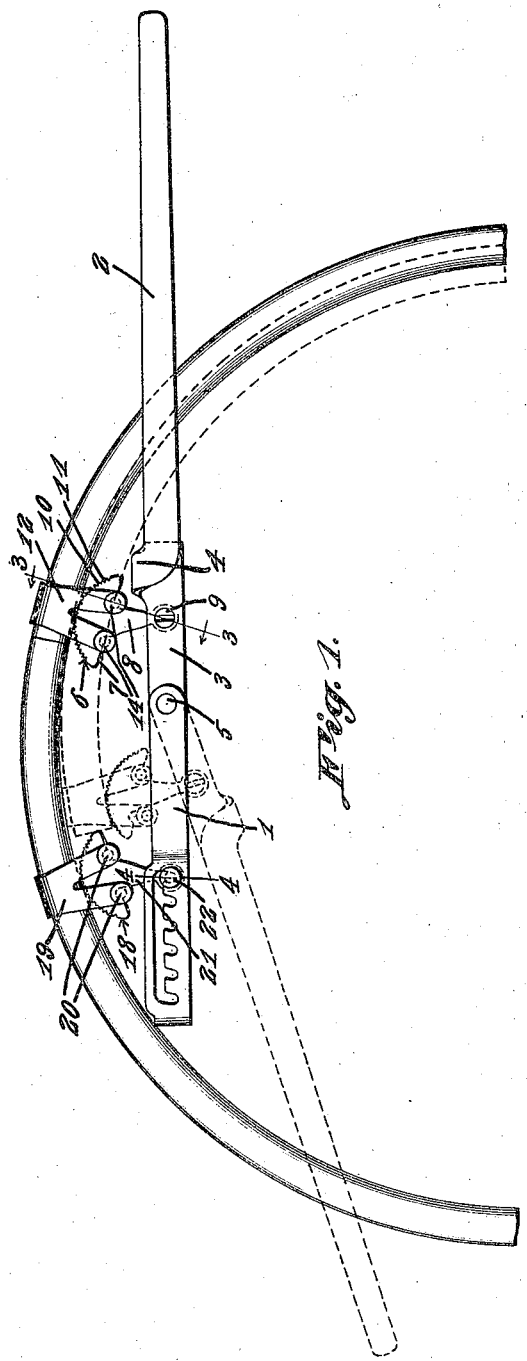
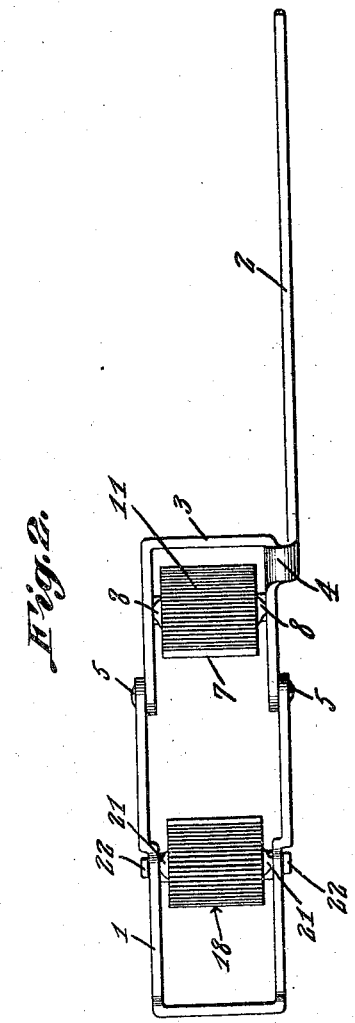
L. L. Gilbert, Inventor
By C. A. Snow & Co.
Attorney

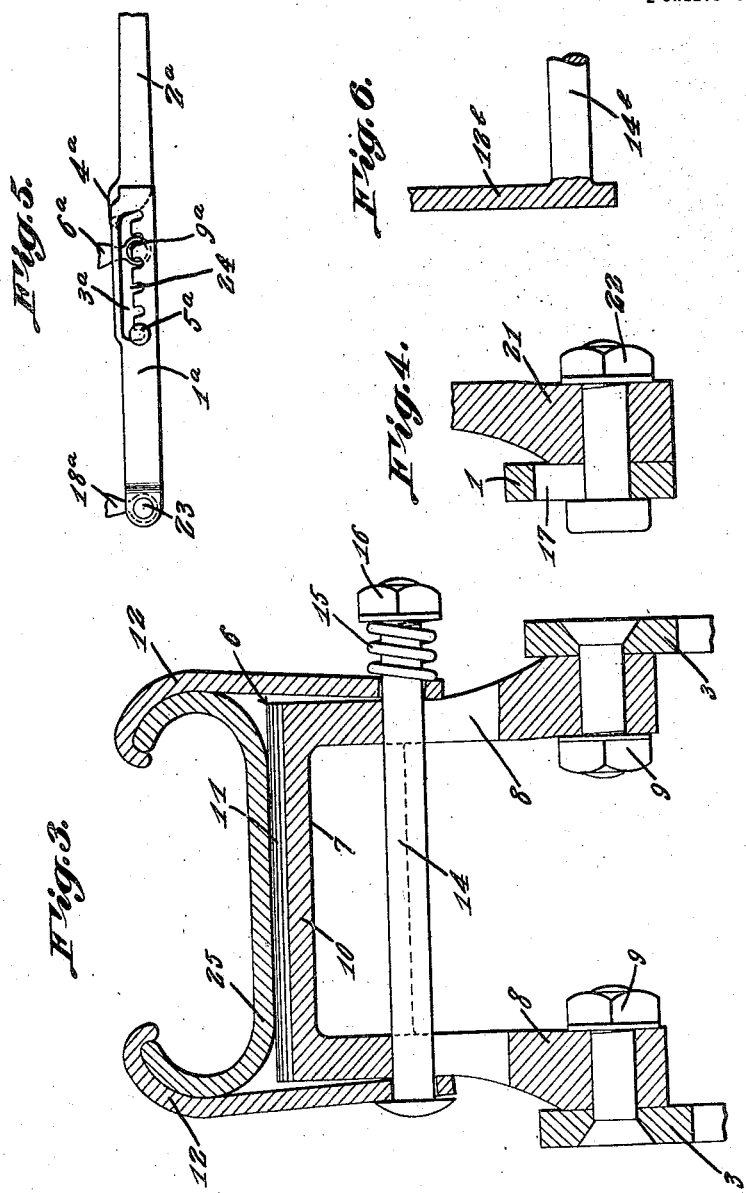

UNITED STATES PATENT OFFICE.

LEVI L. GILBERT, OF CHICAGO, ILLINOIS.

AUTOMOBILE TOOL.

1,419,922.  Specification of Letters Patent.  Patented June 20, 1922.

Application filed July 14, 1920. Serial No. 396,052.

*To all whom it may concern:*

Be it known that I, LEVI L. GILBERT, a citizen of the United States, residing at Chicago, in the county of Cook and State of Illinois, have invented a new and useful Automobile Tool, of which the following is a specification.

The device forming the subject matter of this application is adapted to be used for removing a rim from a tire casing and for replacing the rim on the casing. The invention aims to provide novel means for gripping the rim and so to construct the tool that the ends of the rim may be brought into and out of engagement with each other, without distorting the rim permanently.

Within the scope of what is claimed, a mechanic may work changes without departing from the spirit of the invention.

In the drawings:—Figure 1 is a side elevation, wherein the tool is shown assembled with a rim; Figure 2 is a plan of the tool; Figure 3 is a section on the line 3—3 of Figure 1; Figure 4 is a section on the line 4—4 of Figure 1; Figure 5 is an elevation showing a modification; Figure 6 is an elevation showing a further modification.

The tool comprises a U-shaped main member 1 and a lever 2 connected to a U-shaped offset head 3 by an arch 4, the head and the arch constituting, in effect, parts of the lever. Pivot elements 5 unite the ends of the head 3 with the ends of the main member 1. The numeral 6 denotes a rim grip comprising a head 7 and arms 8, the arms being united by pivot elements 9 with the sides of the part 3 of the lever 2. The grip 6 has a convexed outer surface 10 which may be provided with ribs 11, or be roughened otherwise, although this detail is not insisted on. Hook-shaped rim retainers 12 are provided and are united by connections 14, which serve as fulcra and which may be bolts, the connections being received in the angles defined by the head 7 and the arms 8 of the rim grip 6. A compression spring may be mounted on each connection 14, between one rim retainer 12 and a nut 16 on the connection, the springs adapting the device to rims of different widths, and serving to maintain the retainers 12 engaged with the rim 25, a construction which will be understood clearly when Figure 3 is noted. Bayonet slots 17 are formed in the member 1. The numeral 18 denotes a grip like the grip 6, the numeral 19 designating retainers like the retainers 12, the connections 20 corresponding to the connections 14. The arms 21 of the grip 18 carry pivot elements 22 adjustable in the bayonet slots 17.

The tool is mounted on the rim 25 as indicated in Figure 1, the retainers 19 and 12 engaging the flanges of the rim, as shown in Figure 3, and the convexed surfaces of the grips 6 and 18 coacting with the inner surface of the rim. When the lever 2 is swung from the solid line position of Figure 1 to the dotted line position of that figure, a tilting movement occurs between each grip and the corresponding retainer, this tilting movement taking place on one of the connections, as shown in dotted line in Figure 1. When the lever 2 is swung from the dotted line position of Figure 1 to the solid line position, the tilting movement takes place on the other connection of each pair. This operation produces a certain amount of lost motion, and unless proper compensation is permitted, the ends of the rim 25 will not match up properly. When, therefore, it is proposed to swing the lever 2 from the dotted line position of Figure 1 to the solid line position, to expand and to close the rim, the pivot elements 22 are shifted in the bayonet slots 17, so as to vary the distance between the bearing points of the rim grips 18 and 6. In a device of the class described, employing cam-like grips, considerable difficulty has been experienced hitherto in matching up the ends of the rim in the last half inch or so of movement, and this difficulty, the structure described clearly overcomes. When the rim is opened, the rim is not distorted unduly, there being merely a slight inward movement of one end of the rim, combined with a circumferential movement.

In Figure 5, parts hereinbefore described have been designated by numerals previously used, with the suffix "a." The modification consists in pivoting the grip $18^a$ to the member $1^a$, as indicated at 23, and in permitting the fulcrum $5^a$ of the lever $2^a$ to be shifted in a bayonet slot 24 formed in the side portions of the member $1^a$, near to the ends thereof.

Instead of using the separable bolt 14 of Figure 3, it may be expedient to fashion the connection integrally with one of the rim retainers, as shown at 12ᵇ—14ᵇ in Figure 6.

Especial attention is directed to the fact that the rim is gripped on both sides. Consequently, when the rim is expanded, the ends of the rim move in circumferential alinement. The ends of the rim snap together readily, because the corner at one end of the rim never catches beneath the other end of the rim.

I claim:—

1. In a rim tool, a main member; a lever; rim grips; rim retainers cooperating with the rim grips, each retainer having two fulcra on the corresponding grip, one fulcrum being effective when the lever is swung in one direction, and the other fulcrum being effective when the lever is swung in an opposite direction; means for pivoting one grip to the main member; means for pivoting the other grip to the lever; and means for pivoting the lever to the main member.

2. A split rim contacting and expanding tool comprising a pair of gripping members arranged on opposite sides of the split in the rim, a pair of retainers for supporting each grip on the rim, a pair of spaced bolts connecting each grip with its retainer, an adjustable link connected to one grip, a lever connected to the other grip, and means pivotally connecting the adjacent ends of said lever and link.

In testimony that I claim the foregoing as my own, I have hereto affixed my signature in the presence of two witnesses.

LEVI L. GILBERT.

Witnesses:
 IVY E. SIMPSON,
 MASON B. LAWTON.